United States Patent
Yi

[11] Patent Number: 6,070,802
[45] Date of Patent: Jun. 6, 2000

[54] CARD GUIDING DEVICE FOR CARD READER

[75] Inventor: Young-Kyun Yi, Seoul, Rep. of Korea

[73] Assignee: K. D. Electronics, Inc., Seoul, Rep. of Korea

[21] Appl. No.: 08/847,737

[22] Filed: Apr. 22, 1997

[30]     Foreign Application Priority Data

May 11, 1996 [KR] Rep. of Korea ..................... 96-11522
May 27, 1996 [KR] Rep. of Korea ..................... 96-13243

[51] Int. Cl.⁷ ........................................... G06K 7/80
[52] U.S. Cl. ........................................ 235/475; 235/486
[58] Field of Search ........................ 239/441, 485, 239/479, 483, 482, 484, 475

[56]         References Cited

U.S. PATENT DOCUMENTS

| | | | |
|---|---|---|---|
| 5,146,069 | 9/1992 | Orimoto et al. | 235/475 |
| 5,175,423 | 12/1992 | Kayan | 235/477 |
| 5,196,687 | 3/1993 | Sugino et al. | 235/483 |
| 5,202,551 | 4/1993 | Parrer et al. | 235/486 |
| 5,311,003 | 5/1994 | Saroya | 235/485 |
| 5,332,891 | 7/1994 | Togawa | 235/485 |
| 5,336,877 | 8/1994 | Raab et al. | 235/475 |
| 5,369,259 | 11/1994 | Bleier et al. | 235/441 |
| 5,563,397 | 10/1996 | Fujimoto et al. | 235/441 |
| 5,635,696 | 6/1997 | Dabrowski | 235/449 |
| 5,648,651 | 7/1997 | Inoue | 235/475 |
| 5,696,369 | 12/1997 | Watanabe | 235/454 |

*Primary Examiner*—Thien Minh Le
*Attorney, Agent, or Firm*—Staas & Halsey, LLP

[57]             ABSTRACT

This invention relates to a card guiding device for a card reader comprising a housing formed as one unit, a discharging opening formed on the lower surface of the housing, a pivot plate mounted rotatably to a hinge pin provided in the housing, a guide piece formed on one end of the pivot plate and positioned at one of the two guide rails formed on the housing, a torsional spring supported resiliently between an insertion slot and a curvature piece formed on the center of the pivot plate, a guide hole formed on the pivot plate and guided by a guide pin provided in the housing, thereby preventing error, malfunction and low productivity caused by assembling housing, enabling a card reader to be used immediately without repair by discharging an inserted non-standard card, and preventing error occurrence caused by data signal loss by ensuring adequate positioning and alignment of the card.

6 Claims, 5 Drawing Sheets

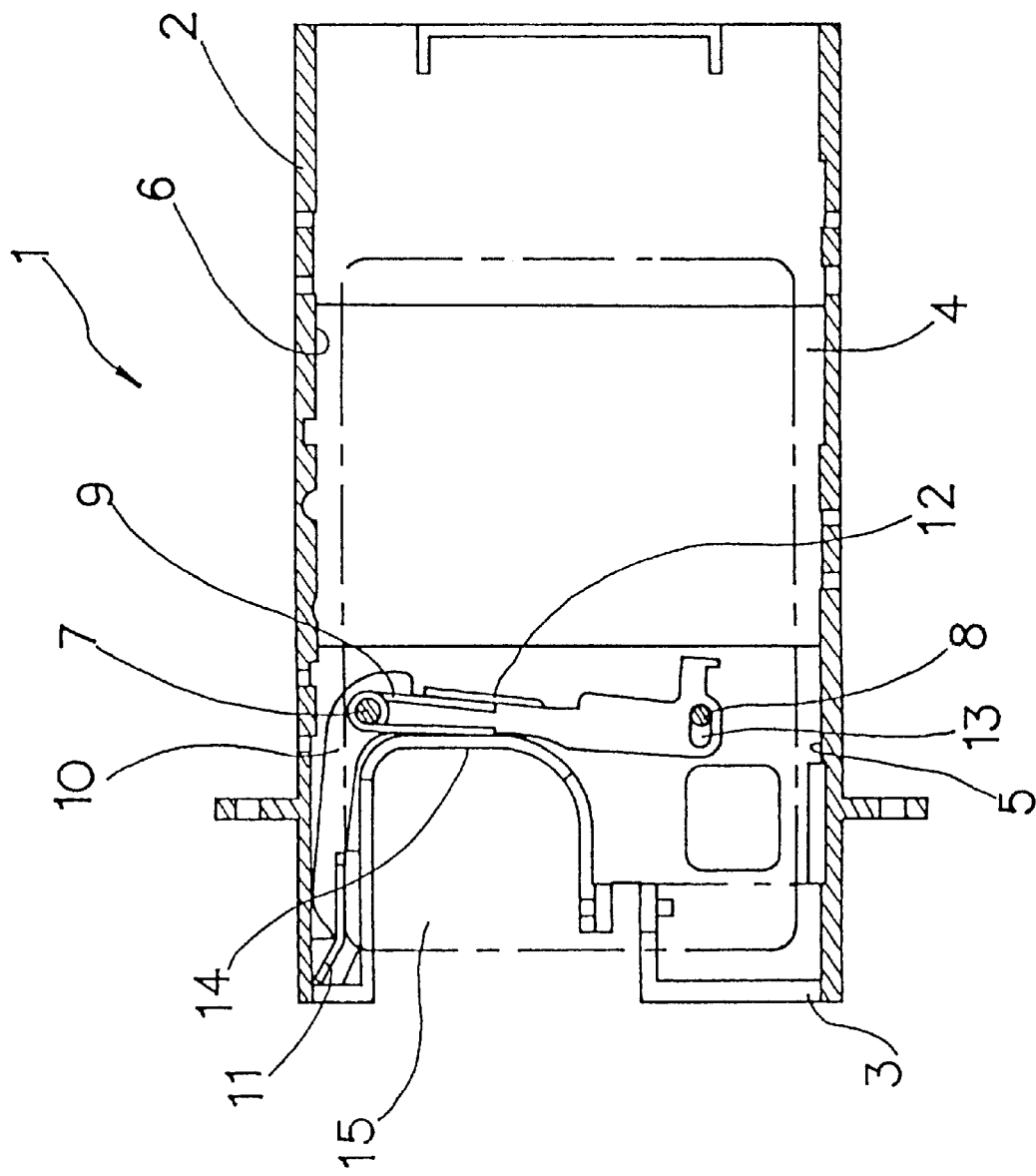

CARD GUIDING DEVICE FOR CARD READER

BACKGROUND OF THE INVENTION (1) Field of the Invention

This invention relates to a card reader in which a user inserts a card into an insertion slot and which reads and writes data on the card, and more specifically to a card guiding device for a card reader that does not malfunction if a card smaller than the standard size is inserted.

(2) Description of the Prior Art

In a conventional card reader, when a card with an IC module or a magnetic stripe is inserted into an insertion slot of a card reader, the IC module contacts a connector of a reading portion or the magnetic stripe passes a head, thereby reading the data on the card.

The housing of a card reader is divided into upper and lower housings between which required components are mounted prior to the assembly of the two housings.

It is difficult to fit the two housings together with hooks. Because of the assembling tolerance, the hooks are often broken during the assembly or disassembly of the apparatus, and malfunctions occur because the assembled upper and lower housings are joined loosely by the assembling tolerance.

Also, when the upper housing and lower housing are assembled using screws, bosses to which the screws are fixed are often broken, and when the housings are assembled using supersonic fusion, errors and malfunction occur from burrs caused by supersonic fusion.

The above problems inherent in the card reader's structure are further exacerbated by the disassembly required for a nonstandard card or other foreign objects to be retrieved after being inserted into the insertion slot.

Lastly, because both sides of the card inserted into an insertion slot are guided by the guide rails formed on both sides of a housing, the distance between the two guide rails is larger than the maximum allowable tolerance of a card size to satisfy the allowable tolerance of a card size in ISO 9000.

Thus, a conventional card reader experiences errors caused by the data signal loss, because the card is not positioned adequately and not properly aligned when the card is inserted and carried.

SUMMARY OF THE INVENTION

The object of this invention is to provide a card guiding device for a card reader in which a housing of the card reader is formed as one unit, a discharge opening is formed on the lower surface of the housing, and the resilient force of a torsional spring is applied to a pivot plate so as to make the card inserted into the housing lie flush against a guide rail.

The utilization of these features prevents errors, malfunctions and low productivity caused by the assembly of a two-piece housing, enables the card reader to be used immediately without repair after a nonstandard card is inserted by discharging the nonstandard card, and also prevents the error occurrence caused by the data signal loss by ensuring the adequate positioning and alignment of the card.

BRIEF DESCRIPTION OF THE DRAWINGS

FIG. 2b is a lateral cross-sectional view of a card reader according to this invention after a card has been inserted.

DETAILED DESCRIPTION OF THE INVENTION

Figure 1:
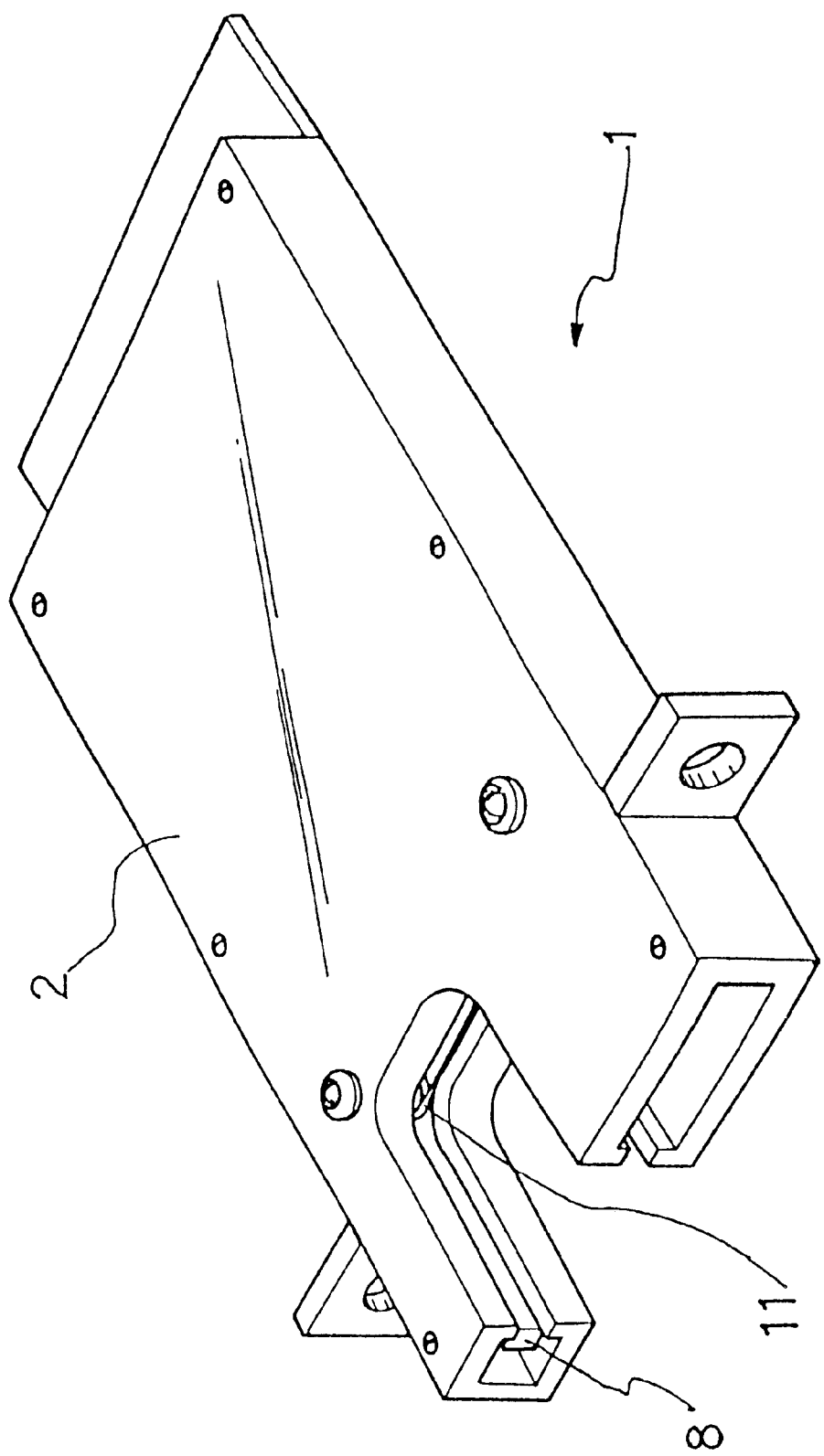
FIG. 1 is a perspective view of a card reader according to this invention.
Figure 2A:
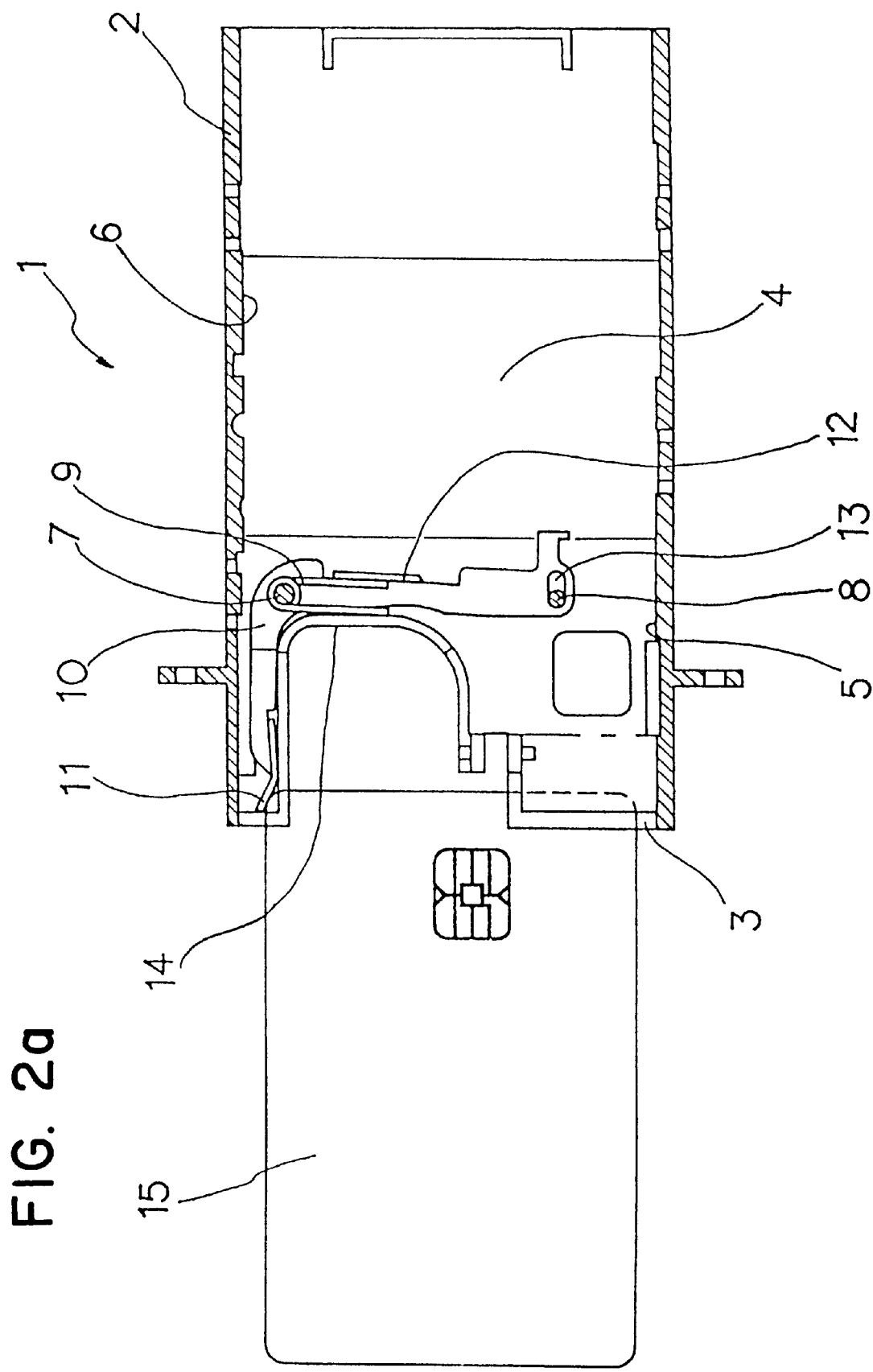
FIG. 2a is a lateral cross-sectional view of a card reader according to this invention before a card is inserted.
Figure 3A:
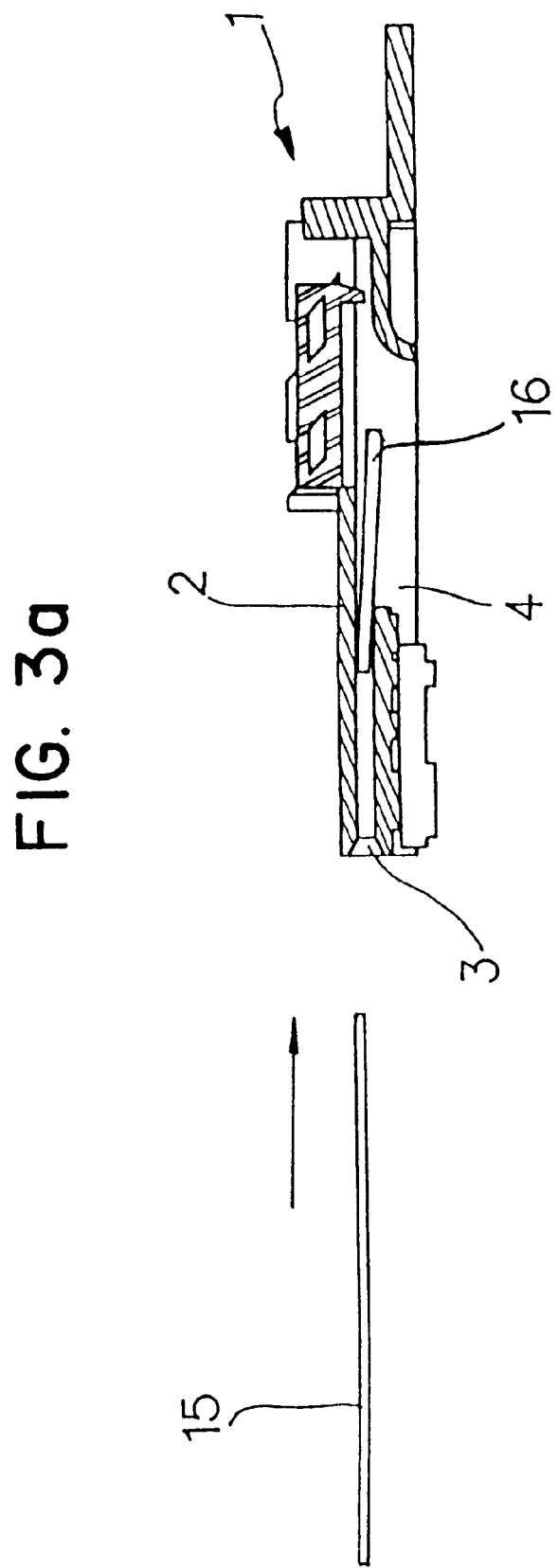
FIG. 3a is a longitudinal cross-sectional view of a card reader according to this invention after a nonstandard card has been inserted.
Figure 3B:
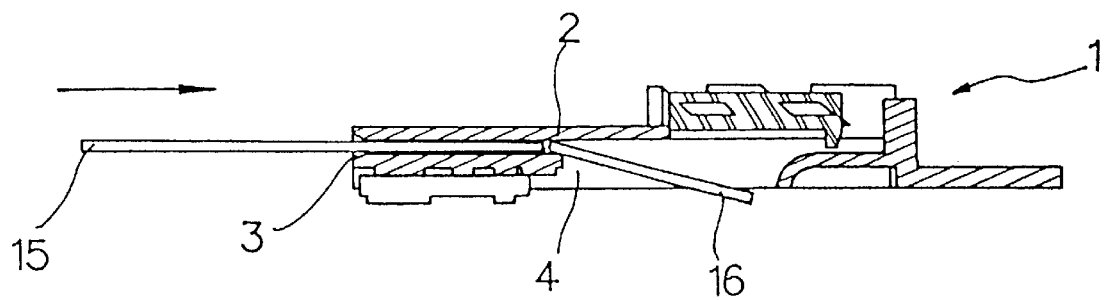
FIG. 3b is a longitudinal cross-sectional view of a card reader according to this invention depicting a standard card being inserted after a nonstandard card has been inserted.
Figure 3C:
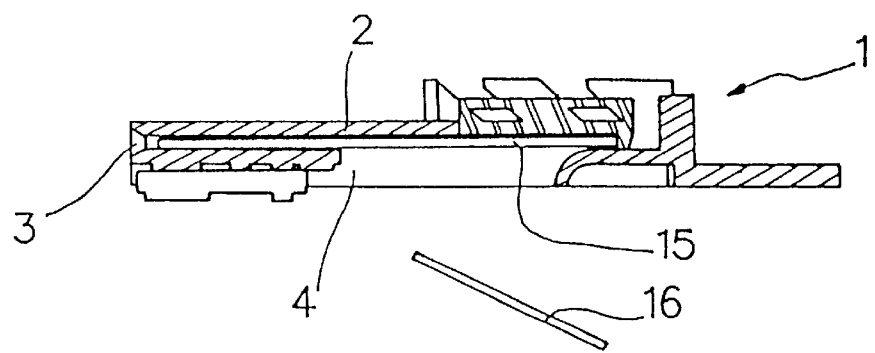
FIG. 3c is a longitudinal cross-sectional view of a card reader according to this invention when a standard card has been completely inserted after a nonstandard card has been discharged.

The preferred embodiment of the present invention will be now described in detail referring to the attached drawings.

A housing (2) of the inventive card reader (1) is formed as one unit, so that the errors, malfunctions and low productivity caused by assembling a two-piece housing are prevented. A discharging opening (4), through which various components are installed is formed on the lower surface of the housing (2), and nonstandard cards (16) and other foreign objects are discharged. A pivot plate (10) is mounted rotatably to a hinge pin (7) formed on the housing (2), and a guide piece (11) is formed on one end of the pivot plate (10) and is positioned at a guide rail (6). A torsional spring (9) is supported resiliently between a rim (14) of an insertion slot (3) and a curvature piece (12) formed on the center of the pivot plate (10), and a guide hole (13) formed on the pivot plate (10) is guided by a guide pin (8) of the housing (2).

The card (15) is inserted into the insertion slot (3) and the data on the card (15) is read and written when the IC module or magnetic stripe of the card (15) respectively contacts the connector or the head.

As the card (15) is inserted into the insertion slot, one end of the card contacts the guide piece (11), which, using the resilient force of the torsional spring (9), pushes the card against the guide rail (5).

This prevents the card (15) from moving latitudinally, thereby ensuring the adequate positioning and alignment of the card necessary for the prevention of data signal loss and the error occurrence.

The guide hole (13) is formed on the opposite side of the pivot plate (10) from the guide piece (11), and is guided by the guide pin (8) formed on the housing (2), thereby enabling the card (15) to be inserted more stably without any rocking of the card (15).

If the nonstandard card (16) smaller than the standard card (15) is inserted into the insertion slot (3) of a conventional card reader, it can not reach the connector and gets stuck in the housing (2). The nonstandard card (16) is then unretrievable and the card reader (1) is inoperable until it is disassembled and repaired.

However, in the card reader (1) of this invention, a standard card (15) subsequently inserted into the insertion slot pushes the nonstandard card (16) further into the housing (2), allowing it to drop through the discharging opening (4) formed on the lower surface of the housing (2).

The standard card (15) then continues to be inserted and the card reader functions normally thereafter.

Also, even if other foreign objects such as a toothpick or a matchstick are inserted, the card reader (1) can be used immediately without repair, because other foreign objects are discharged by the insertion of a standard card.

As discussed above, in the card guiding device for the card reader of the present invention, the housing of the card reader is formed as one unit, the discharge opening is formed on the lower surface of the housing, and the resilient force of the torsional spring is applied to the pivot plate, thereby preventing the error, malfunction and low productivity caused by the assembly of a two-piece housing, enabling the card reader to be used immediately without repair after a nonstandard card is inserted by discharging the nonstandard card, and also preventing the error occurrence caused by the loss of the data signal by ensuring the adequate positioning and alignment of the card.

What is claimed is:

1. A card guiding device for a card reader in which a card inserted into an insertion slot is carried along guide rails formed on a housing of the card reader, and data on the card is read and written when an IC module or magnetic stripe of the card contacts a connector or a head, wherein;

a pivot plate is mounted rotatably to a hinge pin in said housing, a guide piece formed on an end of said pivot plate is positioned at one guide rail, a torsional spring is supported resiliently between a rim of said insertion slot and a curvature piece formed on the center of said pivot plate, and a guide hole formed on the opposite end of said pivot plate is guided by a guide pin of said housing.

2. A card guiding device according to claim 1, wherein said housing is formed as one unit, and a discharge opening is formed on the lower surface of said housing through which components are mounted to said card guiding device and nonstandard cards and other foreign objects are discharged.

3. A card guiding device according to claim 1, wherein said card inserted into said insertion slot lies flush against one of said guide rails by said guide piece formed on said pivot plate to which the resilient force of said torsional springs is applied.

4. A card reader adapted to read a card equipped with a magnetic stripe or an IC module, said card reader comprising:

a unitary body having an insertion slot and a lower surface;

a discharge opening formed in said lower surface adapted to allow non-standard cards or other foreign items to be discharged from said card reader when a standard card is inserted, which pushes out the non-standard card or the foreign item, wherein said unitary body includes a pivot plate rotatable mounted to a hinge pin, a guide plate formed on an end of said pivot plate being positioned at a guide rail, a torsional spring is disposed between a rim of said insertion slot and a curved member formed on a center of said pivot plate, and a guide hole formed on an opposite end of said pivot plate is guided by a guide pin.

5. A card reader as claimed in claim 4, wherein said unitary body includes guide rails for guiding the standard card during insertion and extraction.

6. A method for extracting non-standard cards and other foreign objects from a card guiding device, said method including:

inserting a standard card to push said non-standard card or other foreign objects rearward in said card guiding device, until said non-standard card or other objects is pushed over a discharge opening formed in a lower surface of a housing, wherein the housing includes a pivot plate rotatably mounted to a hinge pin, a guide plate formed on an end of the pivot plate being positioned at a guide rail, a torsional spring is disposed between a rim of the discharge opening and a curved member formed on a center of said pivot plate, and a guide hole formed on an opposite end of the pivot plate is guided by a guide pin; and allowing said non-standard card or other foreign object to drop from said card guiding device, thereby allowing the standard card to be read by a connector or a magnetic head.

* * * * *